US 6,745,293 B2

(12) United States Patent
Lasserre et al.

(10) Patent No.: US 6,745,293 B2
(45) Date of Patent: Jun. 1, 2004

(54) LEVEL 2 SMARTCACHE ARCHITECTURE SUPPORTING SIMULTANEOUS MULTIPROCESSOR ACCESSES

(75) Inventors: Serge Lasserre, Frejus (FR); Gerard Chauvel, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 394 days.

(21) Appl. No.: 09/932,308

(22) Filed: Aug. 17, 2001

(65) Prior Publication Data

US 2002/0065988 A1 May 30, 2002

(30) Foreign Application Priority Data

Aug. 21, 2000 (EP) .............................. 00402331
Dec. 15, 2000 (EP) .............................. 00403536

(51) Int. Cl.[7] .............................................. G06F 12/00
(52) U.S. Cl. .................................. 711/131; 711/129
(58) Field of Search .................................. 711/131, 129

(56) References Cited

U.S. PATENT DOCUMENTS 5,442,747 A * 8/1995 Chan et al. ................. 345/543
5,752,260 A * 5/1998 Liu .............................. 711/129
5,905,997 A * 5/1999 Stiles .......................... 711/129
6,038,647 A 3/2000 Shimizu
6,253,297 B1 6/2001 Chauvel et al.
6,665,775 B1 * 12/2003 Maiyuran et al. ........... 711/129

FOREIGN PATENT DOCUMENTS

EP            0 284 751 A2   10/1988
WO      WO 93 09497A 2      5/1993

OTHER PUBLICATIONS

Texas Instruments Incorporated, S/N: 09/591,537, filed Jun. 9, 2000, *Smart Cache*.

* cited by examiner

*Primary Examiner*—Kevin Verbrugge
(74) *Attorney, Agent, or Firm*—Robert D. Marshall, Jr.; W. James Brady, III; Frederick J. Telecky, Jr.

(57) ABSTRACT

A digital system is provided with a several processors, a private level one (L1) cache associated with each processor, a shared level two (L2) cache having several segments per entry, and a level three (L3) physical memory. The shared L2 cache architecture is embodied with 4-way associativity, four segments per entry and four valid and dirty bits. Multiple detection circuitry responds to several cache access requests concurrently. Multiple ports in the cache service multiple requesters concurrently if concurrent hits are determined by the detection circuitry.

10 Claims, 12 Drawing Sheets

LEVEL 2 SMARTCACHE ARCHITECTURE SUPPORTING SIMULTANEOUS MULTIPROCESSOR ACCESSES

This application claims priority to European Patent Application Serial No. 00402331.3, filed Aug. 21, 2000 and to European Application Serial No. 00403538.2, filed Dec. 15, 2000. U.S. patent application Ser. No. 09/932,651 is incorporated herein by reference.

FIELD OF THE INVENTION

This invention generally relates to microprocessors, and more specifically to improvements in cache memory access circuits, systems, and methods of making.

BACKGROUND

Microprocessors are general purpose processors which provide high instruction throughputs in order to execute software running thereon, and can have a wide range of processing requirements depending on the particular software applications involved. A cache architecture is often used to increase the speed of retrieving information from a main memory. A cache memory is a high speed memory that is situated between the processing core of a processing device and the main memory. The main memory is generally much larger than the cache, but also significantly slower. Each time the processing core requests information from the main memory, the cache controller checks the cache memory to determine whether the address being accessed is currently in the cache memory. If so, the information is retrieved from the faster cache memory instead of the slower main memory to service the request. If the information is not in the cache, the main memory is accessed, and the cache memory is updated with the information.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever increasing DSP performance while keeping power consumption as low as possible.

To further improve performance of a digital system, two or more processors can be interconnected. For example, a DSP may be interconnected with a general purpose processor in a digital system. The DSP performs numeric intensive signal processing algorithms while the general purpose processor manages overall control flow. The two processors communicate and transfer data for signal processing via shared memory. A direct memory access (DMA) controller is often associated with a processor in order to take over the burden of transferring blocks of data from one memory or peripheral resource to another and to thereby improve the performance of the processor.

SUMMARY OF THE INVENTION

Particular and preferred aspects of the invention are set out in the accompanying independent and dependent claims. In accordance with a first embodiment of the invention, there is provided a method of operating a digital system that has a cache with a plurality of request ports. After receiving a set of requests on the request ports, they are evaluated to determine hit/miss status. Multiple hits are served concurrently via separate ports of the cache.

In another embodiment, the cache is configured as two or more distinct portions. A request in each portion can be serviced concurrently. A set of requests are sorted into separate queues each associated with a different portion of the cache.

In another embodiment, the requests in different queues are sorted according to a priority associated with each request in the queue.

In another embodiment, the cache is configured as two or more distinct portions based on a range of addresses assigned to one portion. A request for an address that is assigned to this portion is blocked from other portions of the cache. A request in each portion can be serviced concurrently.

In another embodiment, a digital system is provided with a cache that has a plurality of sets which each have a plurality of lines for holding data and an associated tag to indicate if data stored in each line is valid. One detection circuit is operable to detect if a first requested data is present in the cache by examining one set of tags. Another detection circuit is operable to detect if a second requested data is present in the cache by examining a different set of tags. Both detection circuits operate concurrently. The cache is a level two cache, but in other embodiments the cache may be a first level or a higher level cache.

In another embodiment, a first level cache embodying the present invention may make requests to a second level cache that also embodies the present invention.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the digital system of FIG. 1 and in which.

Corresponding numerals and symbols in the different figures and tables refer to corresponding parts unless otherwise indicated.

DETAILED DESCRIPTION OF EMBODIMENTS OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
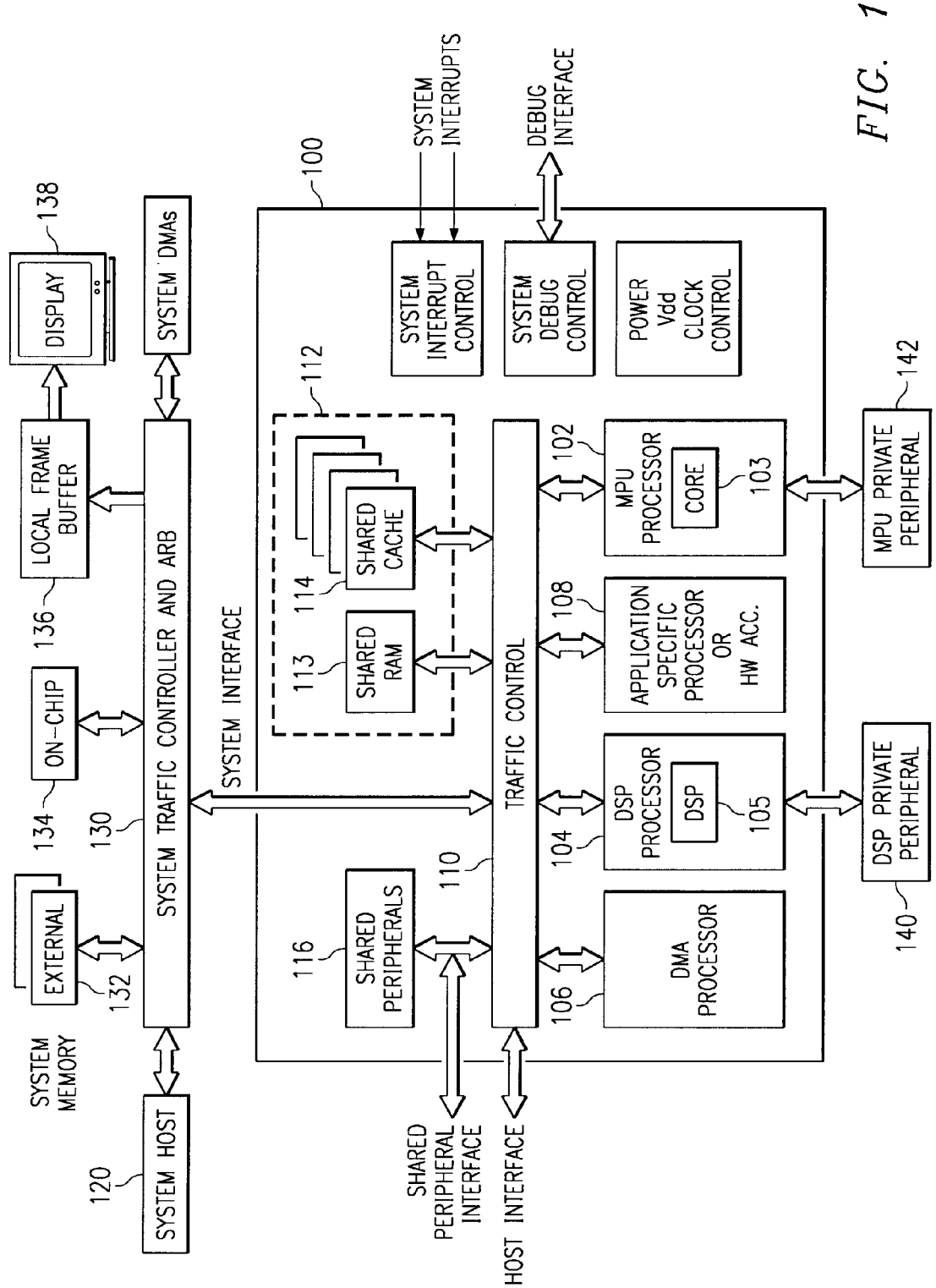
FIG. 1 is a block diagram of a digital system that includes an embodiment of the present invention in a megacell core having multiple processor cores.

FIG. 1 is a block diagram of a digital system that includes an embodiment of the present invention in a megacell core 100 having multiple processor cores. In the interest of clarity, FIG. 1 only shows those portions of megacell 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of megacell 100 relevant to an embodiment of the present invention are explained in sufficient detail herein below, so as to enable one of ordinary skill in the microprocessor art to make and use the invention.

Referring again to FIG. 1, megacell 100 includes a control processor (MPU) 102 with a 32-bit core 103 and a digital signal processor (DSP) 104 with a DSP core 105 that share a block of memory 113 and a cache 114, that are referred to as a level two (L2) memory subsystem 112. A traffic control block 110 receives transfer requests from a memory access node in a host processor 120, requests from control processor 102, and transfer requests from a memory access node in DSP 104. The traffic control block interleaves these requests and presents them to the shared memory and cache. Shared peripherals 116 are also accessed via the traffic control block. A direct memory access controller 106 can transfer data between an external source such as off-chip memory 132 or on-chip memory 134 and the shared memory. Various application specific processors or hardware accelerators 108 can also be included within the megacell as required for various applications and interact with the DSP and MPU via the traffic control block.

External to the megacell, a level three (L3) control block 130 is connected to receive memory requests from internal traffic control block 110 in response to explicit requests from the DSP or MPU, or from misses in shared cache 114. Off chip external memory 132 and/or on-chip memory 134 is connected to system traffic controller 130; these are referred to as L3 memory subsystems. A frame buffer 136 and a display device 138 are connected to the system traffic controller to receive data for displaying graphical images. Host processor 120 interacts with the resources on the megacell via system traffic controller 130. A host interface connected to traffic controller 130 allows access by host 120 to megacell 100 internal and external memories. A set of private peripherals 140 are connected to the DSP, while another set of private peripherals 142 are connected to the MPU.

Figure 2A:
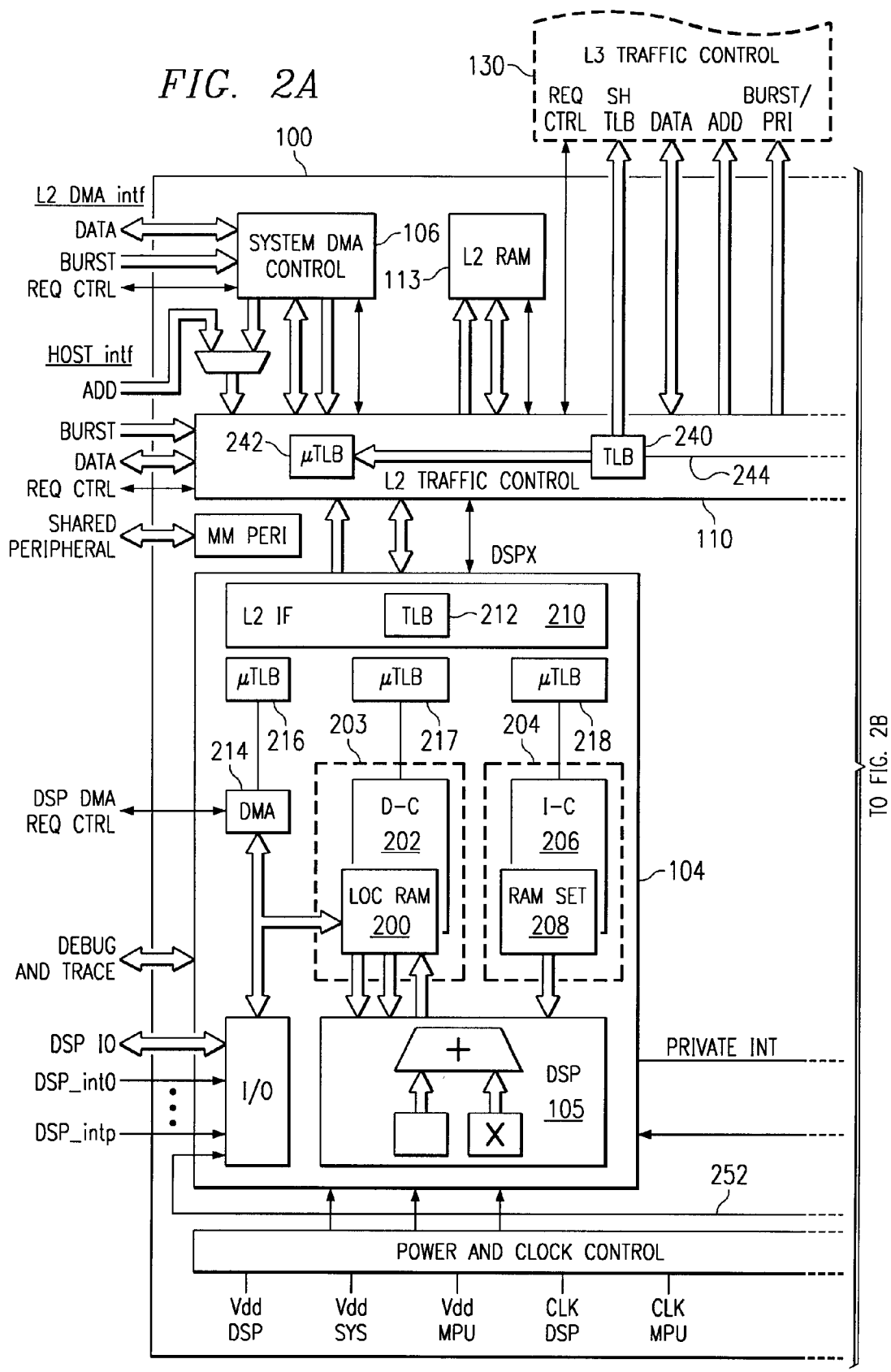
FIGS. 2A and 2B together is a more detailed block diagram of the megacell core of FIG. 1.
Figure 2B:
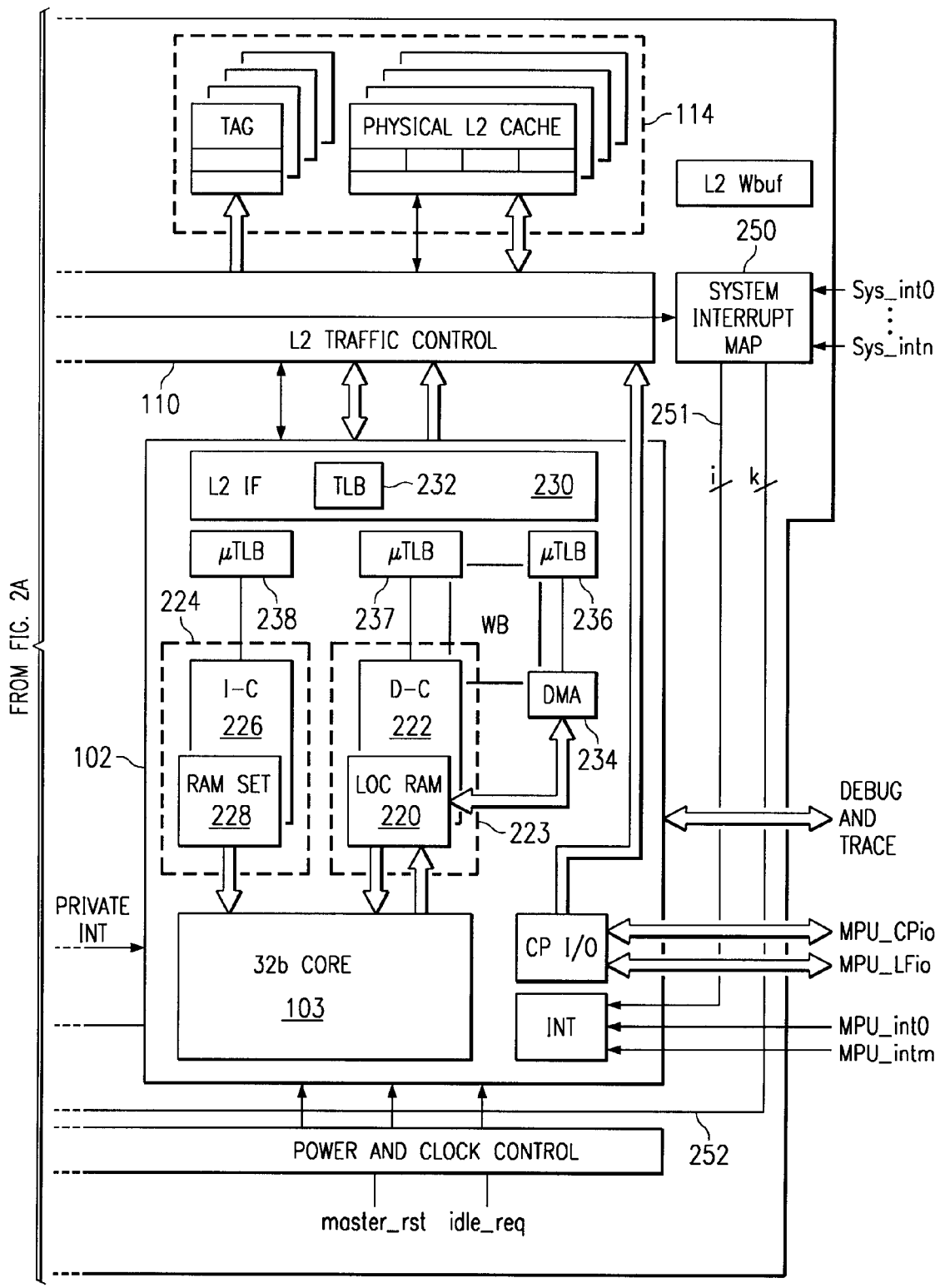

FIG. 2 is a more detailed block diagram of the megacell core of FIG. 1. DSP 104 includes a local memory 200 and data cache 202, a configurable cache 204 that is configured as instruction cache 206 and a block of memory 208, which are referred to as level one (L1) memory subsystems. The DSP is connected to the traffic controller via an L2 interface 210 that also includes a translation look-aside buffer (TLB) 212. A DMA circuit 214 is also included within the DSP. Individual micro TLBs ($\mu$TLB) 216–218 are associated with the DMA circuit, data cache and instruction cache, respectively.

Similarly, MPU 102 includes a local memory 220 and data cache 222, a configurable cache 224 that is configured as instruction cache 226 and a block of memory 228, again referred to as L1 memory subsystems. The MPU is connected to traffic controller 110 via an L2 interface 230 that also includes a TLB 232. A DMA circuit 234 is also included within the MPU. Individual micro TLBs ($\mu$TLB) 236–238 are associated with the DMA circuit, data cache and instruction cache, respectively.

L2 traffic controller 110 includes a TLB 240 and a micro-TLB ($\mu$TLB) 242 that is associated with system DMA block 106. Similarly, L3 traffic controller 130 includes a $\mu$TLB controllably connected to TLB 232 that is associated with system host 120. This $\mu$TLB is likewise controlled by one of the megacell 100 processors. ps Memory Management Unit At the megacell traffic controller level, all addresses are physical. They have been translated from virtual to physical at the processor sub-system level by a memory management unit (MMU) associated with each core, such as DSP core 105 and MPU core 103. At the processor level, access permission, supplied through MMU page descriptors, is also checked, while at the megacell level protection between processors is enforced by others means, which will be described in more detail later.

The TLB caches contain entries for virtual-to-physical address translation and access permission checking. If the TLB contains a translated entry for the virtual address, the access control logic determines whether the access is permitted. If access is permitted, the MMU generates the appropriate physical address corresponding to the virtual address. If access is not permitted, the MMU sends an abort signal via signal group 244 to MPU 102.

Upon a TLB miss, i.e., the TLB does not contain an entry corresponding to the virtual address requested, translation table walk software retrieves the translation and access permission information from a translation table in physical memory. Once retrieved, the page or section descriptor is stored into the TLB at a selected victim location. Because a "load and store multiple" instruction may potentially cross a page boundary, the permission access is checked for each sequential address.

Unpredictable behavior will occur if two TLB entries correspond to overlapping areas of memory in the virtual space. This can occur if the TLB is not flushed after the memory is re-mapped with different-sized pages leaving an old mapping with different sizes in the TLB, and making a new mapping that gets loaded into a different TLB location, for example.

Translation Table

A translation table held in main memory has two levels: a first-level table holds both section translation entries and pointers to second-level tables (either fine tables or coarse tables); second-level tables hold both large, small and tiny page translations entries. The present embodiment has a distributed OS with several domains corresponding to each processor and therefore only a single table manager for all processors. Table update operations are limited to the corresponding R-ID for all slave processors. Access to all could be given to a super OS, such as a communication management OS. The super OS will have right to flush out entries belonging to another processor in a different OS domain. In another embodiment with several independent OSs, for example, there will independent tables. These tables can be located in a memory space only viewed by the OS that they are associated with in order to provide protection from inadvertent modification by another OS.

Translation tables and TLB cache contents must be kept consistent. A flush operation, which will be described later, is provided for this reason.

An address reference is generally located within the $\mu$TLB or main TLB of each processor sub-system; however, certain references, such as those used by system DMA 106 or host processor 120, for example, to access megacell memories can be distributed within L2 traffic controller 110 and cached into L2 system shared TLB 240. Because system performance is very sensitive to the TLB architecture and size, it is important to implement efficient TLB control commands to flush, lock or unlock an entry when a task is created or deleted without degrading the execution of other tasks. Therefore, each $\mu$TLB and L2 cache entry holds a task-ID, also called ASID. During execution, the current task-ID register is compared with the $\mu$TLB entry, this also provides better security, as will be described later. During MMU operation, commands are supplied to flush locked or unlocked entries of a $\mu$TLB corresponding to a selected task.

To provide maximum flexibility, the MMU is implemented as a software table walk, backed up by TLB caches both at the processor sub-system and megacell level. This allows easy addition of new page size support or new page descriptor information if required. A TLB miss initiates an MMU handler routine to load the missing reference into the TLB. At the Megacell 100 level, a TLB miss asserts a miss signal in signal group 244 and is routed via system interrupt router 250 to the processor having generated the missing reference or to the processor in charge of the global memory management, via interrupt signals 251, 252.

The MMU provides cacheability and bufferability attributes for all levels of memory. The MMU also provides a "Shared" bit for each entry to indicate that a page is shared among multiple processors (or tasks). This bit, as standalone or combined with the task-ID, allows specific cache and TLB operation on data shared between processors or/and tasks.

All megacell memory accesses are protected by a TLB. As they all have different requirements in term of access frequencies and memory size, a shared TLB approach has been chosen to reduce the system cost at the megacell level. This shared TLB is programmable by each processor. The architecture provides enough flexibility to let the platform work with either an independent operating system (OS) or a distributed OS with a unified memory management, for example.

The present embodiment supports page size of 1K, 4K, 64K and 1 MB, but other embodiments might have TLB hardware/software supporting other page sizes.

The organization of the data structures supporting the memory management descriptor is flexible since each TLB miss is resolved by a software TLB-miss handler. These data structures include the virtual-to-physical address translation and all additional descriptors to manage the memory hierarchy. In other embodiments, a processor may have other modes that enable access to memory without permission checks.

Shared Cache and RAM

Referring again to FIG. 1, Megacell 100 includes large shared memory subsystem 112 that function as a secondary level of RAM (L2 RAM) 113 and cache (L2 Cache) 114. This level of memory is preferably called the outer level, as each processor in various embodiments may have multilevel internal memory. However, for the present embodiment, processors 102, 104 have one level of internal memory, which is referred to herein as L1 within the memory hierarchy, therefore the outer level memory subsystem will be referred to as level two (L2). The megacell outer memory 112 is organized as what's called a SmartCache, which is a configurable cache and which allows concurrent accesses on cache and RAM-set. RAM-set is a block of RAM that has aspects of cache behavior and cache control operations as well as DMA capability. The SmartCache architecture provides predictable behavior and enhanced real-time performance while keeping high flexibility and ease of use. A detailed description of a SmartCache is provided in U.S. patent application Ser. No. 09/591,537, entitled Smart Cache and is incorporated herein by reference. Advantageously, RAM-set configured as a RAM offers fast memory scratchpad feature.

Megacell "outer" memory 112 can be shared between megacell internal processors and external Host processors or peripherals. RAM usage can also be restricted to the usage of a single processor thanks to the MMU mechanism, described earlier. However, in another embodiment a need might arise in the megacell to add additional physical protection per processor on some part of megacell memory to overwrite the MMU intrinsic protection.

A unified shared cache architecture of this embodiment is a four way set associative cache with segmented lines to reduce system latency. All outer memories are treated as unified instruction/data memory to avoid compiler restrictions such as data in program space or vice-versa. Size of this cache or the degree of associativity is a design choice and may vary in other embodiments of the present invention. General construction of set-associative caches are known and need not be described in detail herein. Typically, L1 caches are 16 kbytes or 32 kbytes, and the L2 cache is 128 kbytes, 256 kbytes or larger, for example. Likewise, the number of associated RAM-sets may vary in other embodiments.

RAM-set control registers, such as control register 531 in cache control circuitry 530 (FIG. 3A), are memory mapped and therefore also benefit from the protection provided by the MMU. However, this would force operations on cache or any specific RAM-set to be on separate pages for protection reasons. Therefore, a control register is provided in TLB control register set 323 (FIG. 3) to configure how and by which CPU the various parts of megacell memory are controlled. All CPUs can execute operations such as cache flushing or cache cleaning as these operations will be restricted by a resource identifier field located in the TAG area of the cache.

Figure 3A:
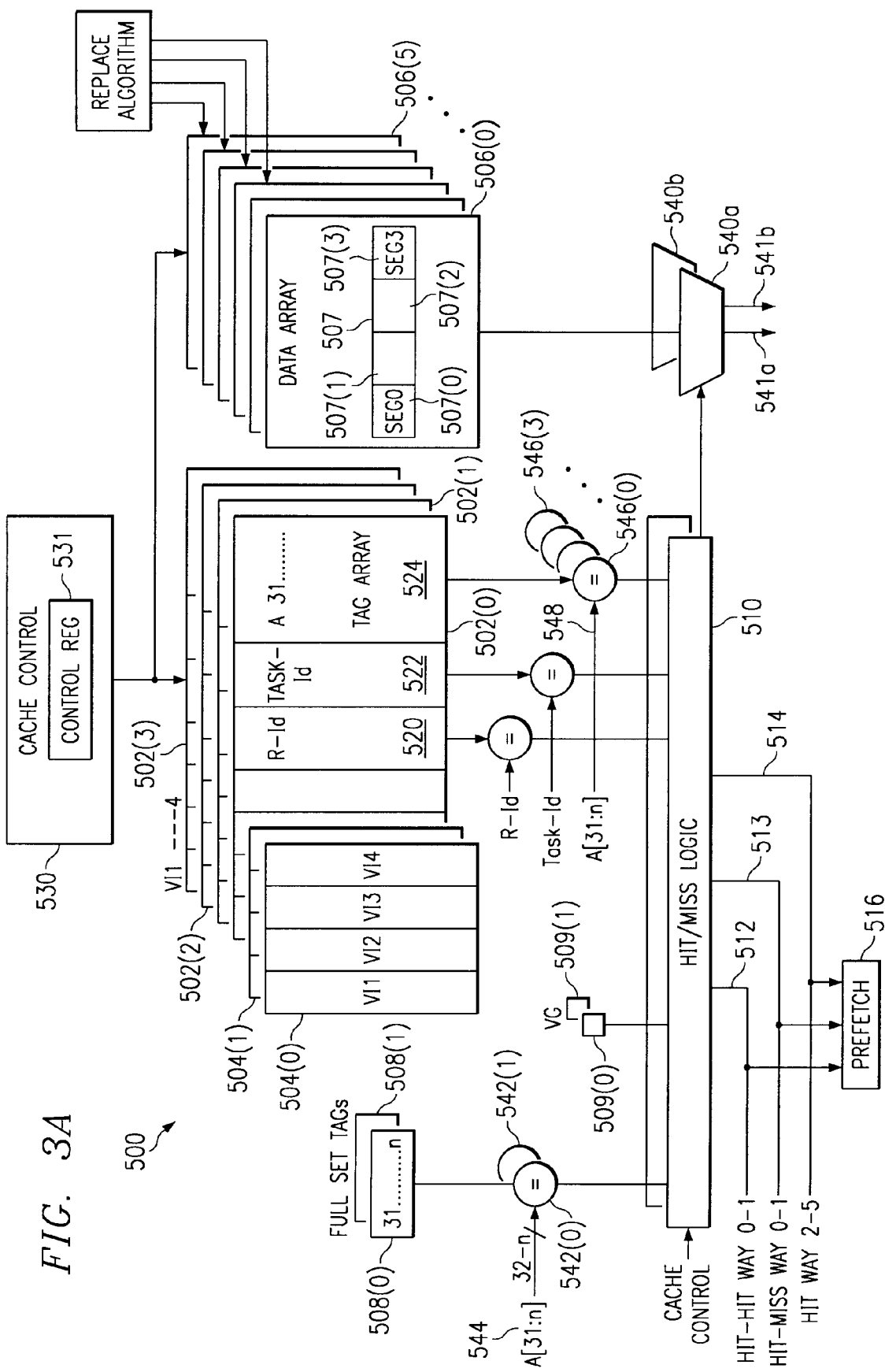
FIG. 3A is a block diagram illustrating a configurable cache that is included in the megacell of FIG. 1 that has a cache and a RAM-set.

FIG. 3A is a block diagram illustrating a representative configurable cache 500 that has a cache representative of L2 cache 114 and a RAM-set representative of shared RAM 113. Configurable cache 500 is also representative of L1 cache 204, 224 that are included respectively in each of the processor modules 102, 104 of FIG. 2. As discussed above, the configurable cache is composed of a 4-way set-associative cache that includes a TAG Array 502(0–3) and Data array 506(2–5) and one or more additional RAM-sets, in this case data arrays 506(0–1). In the present embodiment, data array 506(1–5) are each 32 kbytes, while data array 506(0) is 64 kbytes.

During an access request, each TAG array 502(0–3) provides a tag value to a respective comparator 546(0–3) and is compared against a most significant portion of a proffered address 548. A tag value is stored in tag array 502(0–3) according to an index value that corresponds to a least significant address of a proffered address. Thus, for any proffered address, an associated tag may be found on any one of the four tag arrays. If a tag matches a proffered address, then hit/miss logic 510 asserts a respective hit signal hit-way(2–5) 514. In this embodiment, a resource ID (R-ID) field 520 and a task ID (task-ID) field 522 is also included with each entry in the tag array, along with a set of valid bits VI(1–4). Usage of these fields will be described in more detail later. Prefetch circuitry 516 receives signals 512–514 and forms a request to L3 memory when a miss occurs. For each hit, the requested date is provided via bus 541b to an output port of the cache via cache output buffer 540b.

The RAM-set also includes valid bit arrays 504(0–1) The RAM-set can be configured as a cache extension or as a block of RAM. When configured as RAM, a loading mechanism is provided by a separate DMA engine to optimize data transfer required by multimedia applications. For each hit in the RAM-set portion of the cache, requested data is provided via bus 541a a second output port of the cache via cache output buffer 540a.

Cache control circuitry 530 includes control registers 531 which are used to configure the configurable cache. Fields in the control register include: RAM_fill_mode, Cache_enable, organization, and Full_RAM_base. The control circuitry is coupled to all of the operational blocks of the configurable cache and allows for dynamic reconfiguration of the configurable cache under control of software.

In the embodiment of FIG. 3A, the RAM-set has two different sized data arrays, Data array 506(0) is 64 kbytes and Data array 506(1) is 32 kbytes; however, other embodiments may specify all RAM-sets with the same size to simplify the hardware logic and the software model.

Each RAM-set has an associated TAG register, referred to as Full Set Tag 508(0-1) containing the base address of the RAM-set and a global valid bit (VG) 509(0–1) in addition to an individual valid bit contained in valid bit arrays 504(0–1), referred to as VI, for each segment of each segmented line in the associated data array. In the present embodiment, RAM-set lines have the same size as the cache lines; however, in other embodiments a longer line size can also be used to reduce the number of VI bits. RAM-set base registers are coupled with a logical comparison 542(0–1) on a most significant address portion 544 for each access request.

An organization field in cache control register (RAMset-ctrl[n]) 531 for each RAM-set provides the capability to configure it as a cache extension (RAM-set) or as a plain RAM. When configured as a plain RAM, the valid bits are ignored. Table 1 explains other fields in this register.

TABLE 1

| Cache Control Register | |
|---|---|
| Bit[0] | 0-MPU master. Only the MPU can write to this register |
| | 1-DSP master. Only the DSP can write to this register |
| Bit[1] | 0/1 RAM-set work as a cache or as a RAM |
| RAM-set master bit | each RAM-set can be controlled by one or the other processor write access to the register base |

A status register provides cache information, including number of RAM-sets, sizes, Cache number of way, and line size.

When configured as a RAM, base address registers 508 (0–1) are programmed such that this memory does not overlap with other memories in the system. Note, the base address register and the full set tag register are the same. This memory space is mapped as non-cacheable at the outer level. RAM control logic (address decode) generates a hit equivalent signal, which prevents the outer cache from fetching the missing data/instruction to the external memory. VG bit 509(0–1) acts as an enable/disable. It is set when the base address register is written to and cleared when the RAM is invalidated or disabled.

If the register base address of the RAM is programmed in such a way that the associated memory area overlays with the external memory, coherency is not guaranteed by hardware of this embodiment.

When configured as a cache, hit/miss control circuitry 510 generates hit/miss signals called hit-hit 512 and hit-miss 513 for each RAM-set. A hit-hit is generated when a valid entry of the RAM-set matches the address provided by the core. An entry is valid when both VG and its VI are set. A hit-miss signal is generated when the base address of the RAM is valid (VG=1) and matches the most significant portion of an address provided by a processor but the selected entry in the RAM-set has its VI equal to zero.

The hit-miss or hit-hit signal has precedence over the hit way (2–5) signals 524 of the 4-way set-associative cache. This implies that any value loaded previously in the cache that should be in the RAM-set is never selected and will eventually be removed from the cache. However, data can create coherency problem in case of modified data (copy back). Therefore, it is recommended to write back ("clean") or even flush the range of address that will correspond to the RAM-set range of addresses.

Figure 3B:
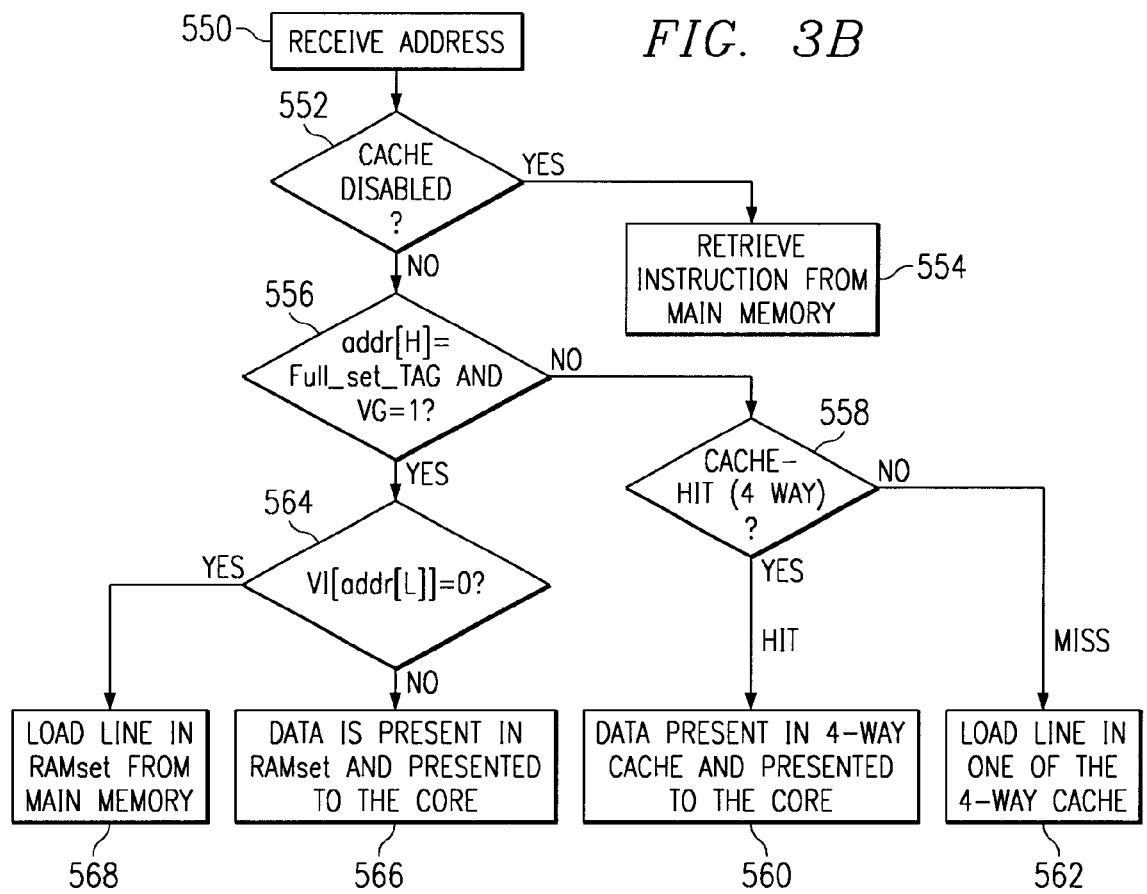
FIG. 3B is a flow chart illustrating operation of the hit/miss logic of the configurable cache of FIG. 3A.

FIG. 3B is a flow chart illustrating operation of the hit/miss logic of the configurable cache of FIG. 3A. In step 550, an address is received from the processor core in connection with a read operation. If the instruction cache is disabled, which is checked in step 552, the instruction is retrieved from second level memory in step 554. If the cache is enabled, then if either the high order bits of the address from the processor (ADDR[H]) do not match the high order bits of the starting address 508(n) or the global valid bit 509(n) is set to "0" (step 556), then there is a RAM-set miss. In this case, if there is a cache hit in the 4-way set associative cache in step 558, then the information is retrieved from the 4-way set associative cache is presented to the core processor via cache output buffer 540b. If there is a miss in the 4-way set associative cache, the line is loaded into the 4-way cache from second level memory.

Returning again to step 556, if both the high order bits of the address from the processor (ADDR[H]) match the high order bits of the starting address 508(n) and the global valid bit 509(n) is set to "1", then there is a RAM-set hit at the line corresponding to ADDR[L], and the valid entry bits are used to determine whether it is a hit-hit situation where the requested instruction is present in the RAM-set and can be presented to the processor, or a hit-miss situation where the requested instruction is mapped to the RAM-set, but the information needs to be loaded into the RAM-set's data array 506(n) from the second level memory. If, in step 564, the individual valid entry bit (VI) 504(n) for the line indicates that the line is valid (VI[ADDR[L]]=1), the instruction is present in the RAM-set and is presented to the processor through the RAM-set's output buffer 540a. If, on the other hand, the valid entry bit for the line indicates that the line is not valid (VI[ADDR[L]]=0), the line is loaded into the data array 506(n) of the RAM-set from main memory in step 568.

Cache Features

The unified cache memory of the present embodiment supports write back, and write through with/without write-allocate on a page basis. These controls are part of the MMU attributes. Hit under miss is supported to reduce conflicts between requesters and consequent latency. Concurrent accesses on RAM-sets and cache are supported.

Referring again to FIG. 3A, on a cache miss, the segment corresponding to the miss is fetched from external memory first. For this discussion, data array 506(0) will be discussed, although it is actually configured as a RAM-set instead of Cache. All of the data arrays 506(0–5) have the same organization. Each data array has a number of lines, line 507 being representative, which are segmented into four segments 507(0–3) that each hold 16 bytes data or instruction. For example, in L1 cache 224 if a miss occurs in second segment 507(1), the second segment is fetched from second level RAM 113 or cache 114 or from third level memory 132, 134 if the second level misses. Then, the third segment and finally the fourth segment are loaded into segments 507(2) and 507(3) automatically, referred to as automatic hardware prefetch. In this embodiment, first segment 507(0) is not loaded into the cache. This sequence of loads can be interrupted on a segment boundary by a miss caused by a request having higher priority. The interrupted load is not resumed, as the remaining segments will be loaded if required later in response to a new miss.

Likewise, second level cache 114 has a data array with a number of lines that are segmented into four segments that each hold 16 bytes. If second level cache 114 misses, it will be filled from third level memory 132, 134 using a multi-cycle operation in which each segment of a given line is accessed. Multi-cycle operations on second level cache 114 are non-blocking. A Multi-cycle cache operation is launched and a status bit indicates its completion. As operations can be initiated by several requesters, such as DSP 104 and MPU 102, these operations can not be blocking due to real time constraints. If one processor initiates a clean_all_task_ID or a block operation for example, other requests can interleave.

Each cache segment has a valid bit (VI) and a dirty bit (not shown) in tag array 502(0–3). Each line such as 507 also has an associated shared bit (not shown) in the tag array. On a write back when a line is replaced, only the segments with modified (dirty) data are written back. Each RAM-set segment has a valid bit (VI) in tag array 504(0–1).

In this embodiment, RAM-sets do not have Task_ID and R-ID fields and shared bit markers associated with each line. Operations on task_ID, R-ID, data marked as shared are limited to the cache. However, another embodiment may harmonize the RAM-set and cache. The hit logic of second level cache 114 only uses the address field. Task-Id and R-Id are used in task operations only.

In this embodiment, L1 caches 202, 206, 222, 226 and L2 cache 114 are organized as 4-way set associative caches. A random cache replacement strategy has been chosen for the replacement algorithm of the 4-way set associative caches. In this embodiment, the caches do not support cache entry locking except through the RAM-set.

Table 2 includes a listing of the various cache and RAM control operations that can be invoked by the processors in the megacell of the present embodiment. In this embodiment, all operations on an entry operate on segments, and there are four segment per entry, as discussed above.

A state machine in cache controller circuitry 530 executes a requested control operation, as indicated by a control word.

In another embodiment, the control operations can be invoked by executing an instruction that invokes a hardware or software trap response. As part of this trap response, a sequence of instructions can be executed or a control word can be written to selected address, for example. In another embodiment, one of the processors may include instruction decoding and an internal state machine(s) to perform a TLB or Cache control operation in response to executing certain instructions which may include parameters to specify the requested operation.

TABLE 2

Cache and RAM Control Operations
(C: operation on the cache, RS: operation on RAM-set, R: operation on RAM)

| Function | | Software view (memory mapped/co-proc) |
|---|---|---|
| Flush_entry(address) | C/RS | Flush the entry[1], whose address matches the provided address or a Range of addresses, if End has been set previously. Flush-range instruction is made of two consecutive instructions Set_End_addr(address) + Flush_entry(address) |
| Flush_all_entry_of_task_ID(task_ID) | C | Flush all entries matching to the current taskID in the cache but not in the RAM-set |
| Flush_all_entry_of_R_ID(task_ID) | C | Flush all entries matching to the current R_ID in the cache but not in the RAM-set |
| Flush_all | C | Flush all entries in the cache but not in RAM-set |
| Flush_all_shared | C | Flush all entries marked as shared |
| Flush_all_task_ID_shared(task_ID) | C | Flush all entries matching the current taskID and marked as shared |
| Flush_all_task_ID_not_shared (task_ID) | C | Flush all entries matching the current taskID and marked as not shared |

TABLE 2-continued

Cache and RAM Control Operations
(C: operation on the cache, RS: operation on RAM-set, R: operation on RAM)

| Function | | Software view (memory mapped/co-proc) |
|---|---|---|
| Clean_entry(address) | C/RS | Clean the entry[1], whose address matches the provided address or a Range of address if End has been set previously. Clean-range instruction is made of two consecutive instructions Set_End_addr(address) + Clean_entry(address). |
| Clean_all_entry_of_taskID(task_ID) | C | Clean all entries matching to the current taskID in the cache but not in the RAM-set |
| Clean_all_entry_Of_R_ID(task_ID) | C | Clean all entries matching to the current R_ID in the cache but not in the RAM-set |
| Clean_all | C | Clean all entries in the cache but not in RAM-set |
| Clean_all_shared | C | Clean entries marked as shared |
| Flush_all_task_ID_shared(task_ID) | C | Flush all entries matching the current taskID and marked as shared |
| Clean_all_taskID_not_shared(Task_ID) | C | Clean all entries matching the current taskID and marked as not shared |
| Clean&Flush_single_entry(address) | C/RS | Clean and flush the entry[1], whose address matches the provided address or a Range of address if End has been set previously. Clean-range instruction is made of two consecutive instructions Set_End_addr(address) + Clean_entry(address). |
| Clean&flush_all_entry_of_taskID (Task_ID) | C | Clean and flush all entries matching to the current taskID in the cache but not in the RAM-set |
| Clean&flush_all_entry_of_R_ID (Task_ID) | C | Clean and flush all entries matching to the current R_ID in the cache but not in the RAM-set |
| Clean&flush_all | C | Clean and flush all entries in the cache but not in RAM-set |
| Clean&flush_all_shared | C | Clean and flush entries marked as shared |
| Clean&flush_all_taskID_shared (task_ID) | C | Clean and flush all entries matching the current taskID and marked as shared |
| Clean&flush_all_ taskID_not_shared(task_ID) | C | Clean and flush all entries matching the current taskID and marked as not shared |
| Set_RAM_Set_Base_addr(RAM-setID) | RS/R | Set new RAM-set base address, set VG and clear all VI and set End to last RAM-set address by default preparing the full RAM-set loading. In that case no need to write the END address before writing the start address to load the RAM-set |
| Set_End_Addr(address) | C/RS | Set end address of the next block load and set the RAM-set controller in block fill mode. |
| Set_start_addr(address) | C/RS | Set start address of a block and initiates the loading of this block |
| Flush_RAM-set(RAM-set_ID) | RS/R | Clear VG and all VI of the selected RAM-set |

Detailed Aspects

Various aspects of the digital system of FIG. 1 will now be described in more detail.

Figure 4:
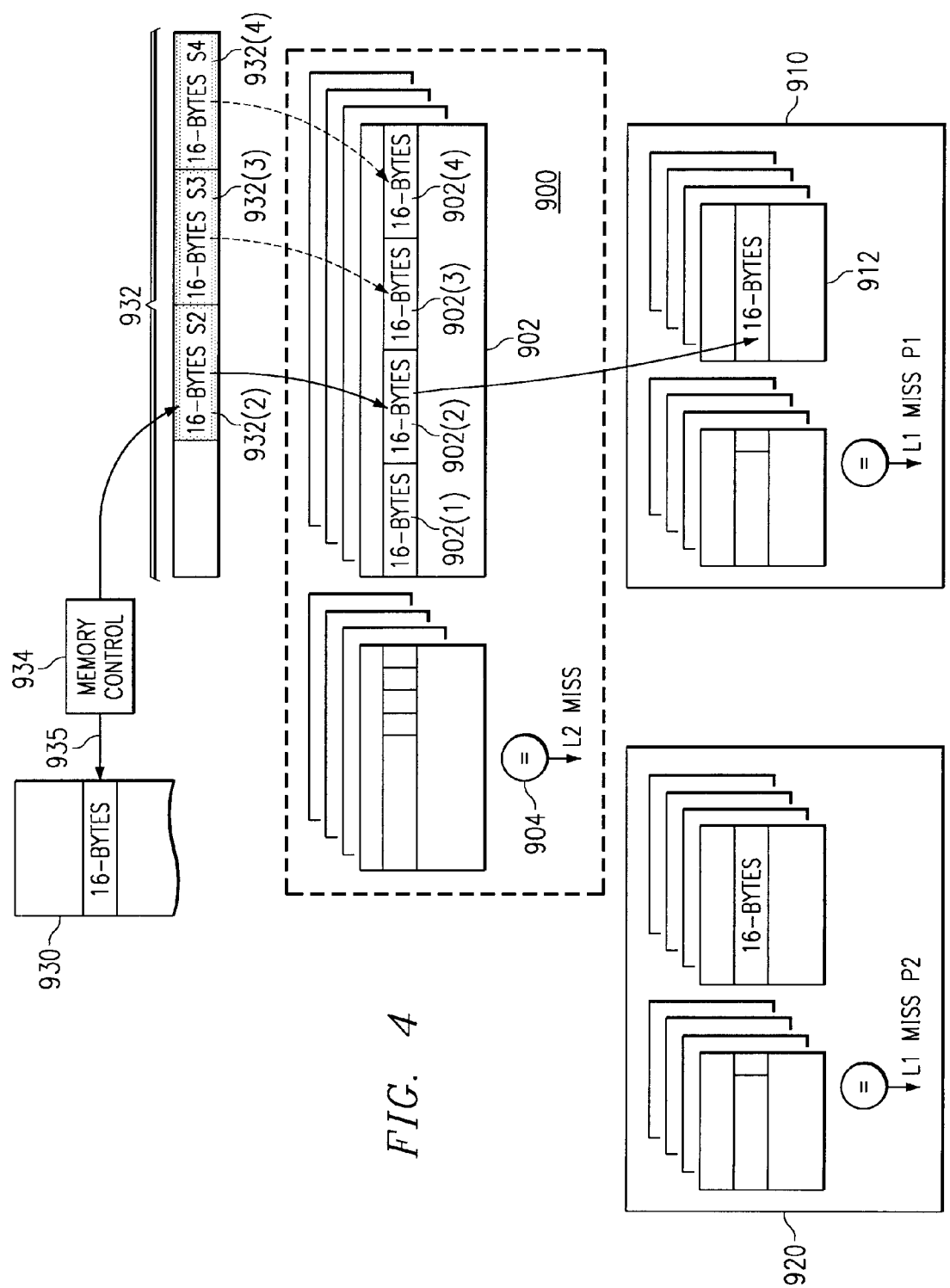
FIG. 4 is a flow diagram for the level two (L2) cache in the megacell of FIG. 1 illustrating an interruptible prefetch system that provides miss under miss support.

FIG. 4 is a flow diagram of an L2 cache 900 representative of L2 cache 114 in the megacell of FIG. 1, illustrating an interruptible prefetch system that provides miss under miss support. As described above, the L2 cache architecture of this embodiment is embodied with 4-way associatively, four segments per entry and four valid and dirty bits per entry. Backup memory 930 is representative of any L3 memory 132/134. When the L2-cache misses, the penalty to access data within L3 memory 132, 134 is high. The system supports miss under miss to let a second miss interrupt the segment prefetch for a first miss.

For example, when a processor P1 910 access to its L1 cache 912 misses and L2 cache 900 also misses, an L2-cache controller accesses backup memory 930 and transfers one or several segments 932 of 16 Bytes from memory 930 to a cache line 902, for example, in L2 cache 900. Memory controller 934 generates an address header 935 to access memory 930 in burst mode and one or several segments 932(n) of 16 Bytes can be transferred for the same request. If, for example, an access to a segment 902(2) misses as indicated by miss circuitry 904, then the controller associated with miss circuitry 904 fetches segment 932(2) and prefetches segment 932(3) and segment 932(4). Segment 932(2) is simultaneously forwarded to processor P1 to satisfy its request. During the miss time, other request that hit the L2 cache can be served. Subsequently, if an access from a processor P2 920 misses the L2 cache, then the ongoing prefetch sequence for processor P1 is stopped and the P2 miss is served. Therefore, some of the segments in line 902 will be valid, such as 902(2–3) for example, and some of them will still be invalid, such as 902(1,4) for example if a prefetch sequence is interrupted.

In this embodiment of the invention, a later access to line 902 will result in a miss if segment 902(1) is accessed. However, since segment 902(2–3) are valid, they will not be prefetched, only segment 902(4) will be prefetched.

Thus, an interruptible L2-cache prefetch system with miss under miss support is provided.

Figure 5:
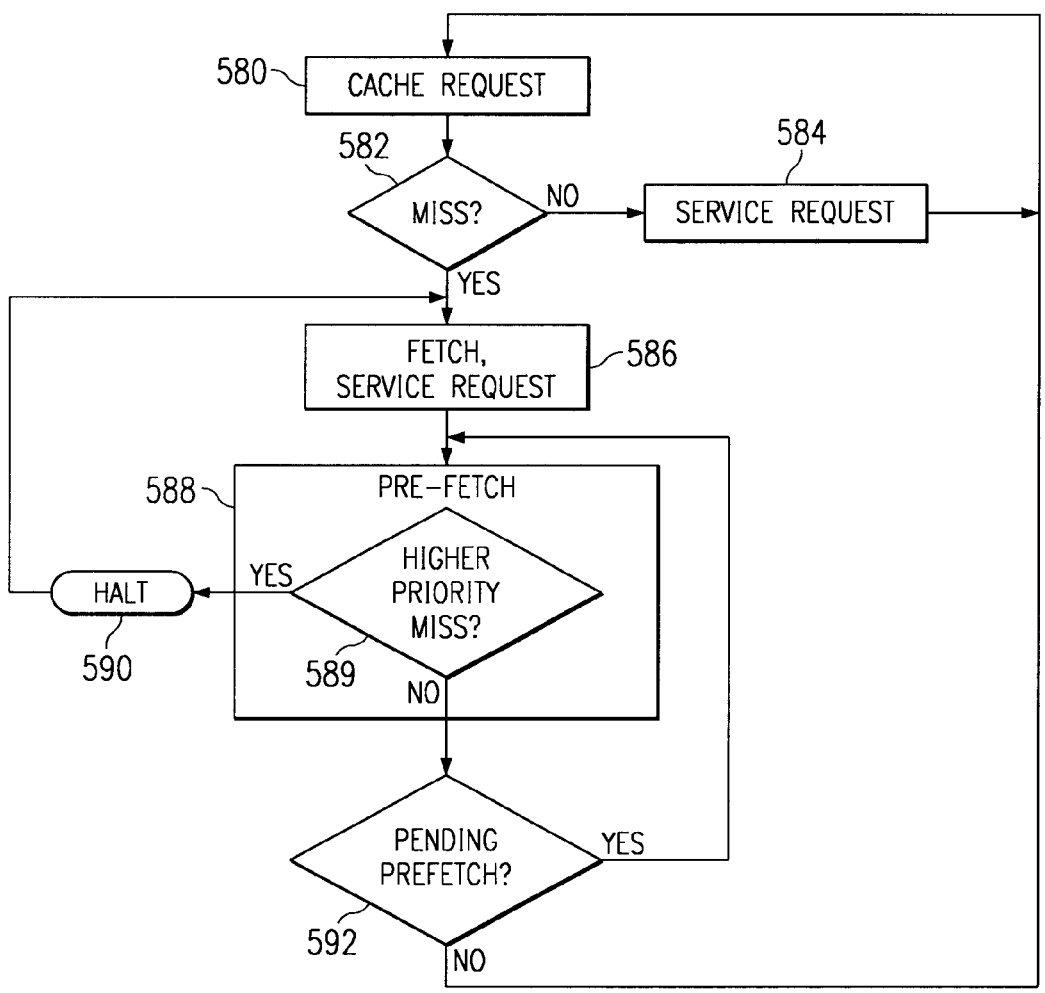
FIG. 5 is a flow chart illustrating operation of the interruptible prefetch system of FIG. 4.

FIG. 5 is a flow chart illustrating operation of the interruptible prefetch system of FIG. 4. This is a method of operating a digital system that has a cache with a plurality of lines, with more than one segment per line. In step 580, a request is made by a requester for a data item. As discussed with reference to FIG. 1 and FIG. 2, this request may come from any of several resources that are connected to traffic controller 110.

In step 582, detection circuitry in the cache determines if the requested data is present in the cache. If the data is present, the request is serviced by returning the requested data to the requester in step 584. If not, a miss occurs.

In step 586, a segment is fetched from memory that contains the requested data item. As discussed earlier, each line of the cache of the present embodiment contains four segments, and each segment contains sixteen bytes. Generally, the requested data item will be four bytes or less. After the segment is fetched, the request is serviced by providing the requested data to the requester.

In step 588, other segments for the same line are prefetched. Steps 586 and 588 are actually performed in a single operation by sending one request to memory controller 934, as discussed with reference to FIG. 4. While the prefetch continues, other requests are received and processed by the cache. If the requested data is within the just fetched segment or in segments that have been successfully prefetched or in other valid lines of the cache, then the cache services the request and the prefetch continues.

If a miss occurs prior to completing the prefetch of step 588, as indicated in step 589, then a decision is made. If the miss has a lower priority than the active prefetch operation, then the miss is queued and the prefetch continues, as will be described in more detail with respect to FIG. 8B; however, if the miss has a higher priority than the active prefetch operation, then the prefetch operation is halted in step 590 and a new fetch/prefetch operation is started by repeating steps 586/588. In step 589, priority of a request is determined based on the priority of the requesting hardware device and the priority of the software task on that device, as will be discussed in more detail with reference to FIG. 9.

After completion of a prefetch operation in step 588, a check is made in step 592 to determine if there are is a pending prefetch that was halted by step 590. If so, it is resumed by returning to step 588. In another embodiment, if a prefetch is halted in step 590, then it is cancelled. In this case, step 592 is not performed.

While this description has been oriented to L2 cache 114, it can also apply to L1 caches 202, 206, 222, and 226, for example.

Figure 6A:
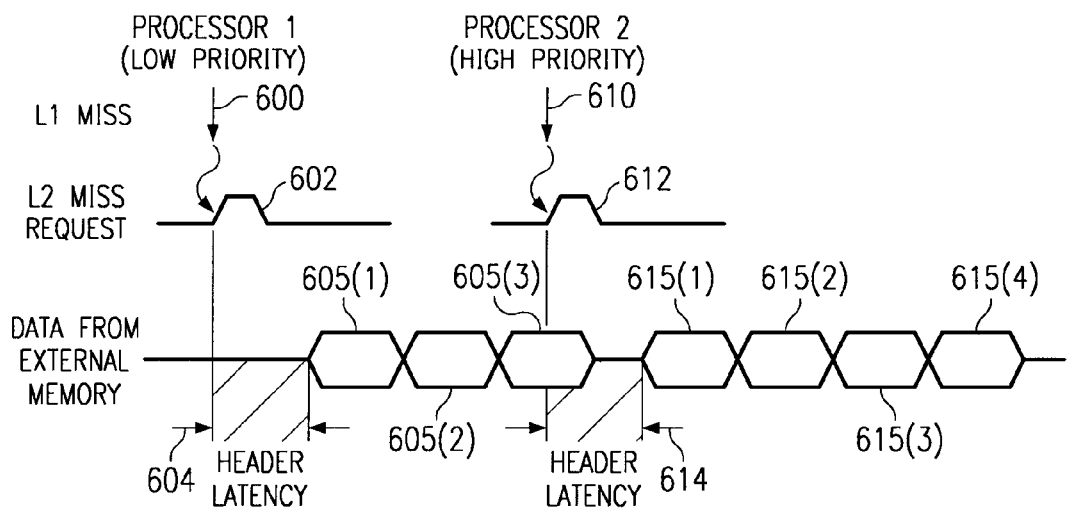
FIG. 6A is a timing diagram of the interruptible prefetch system illustrating a low priority prefetch being halted in favor of a higher priority miss.

FIG. 6A is a timing diagram of the interruptible prefetch system illustrating a low priority prefetch being halted in favor of a higher priority miss. In this diagram, an L1 miss results in a request to L2 cache 114. The L1 miss can be from any of the L1 caches 202, 206, 222, and 226 or from other devices connected to traffic controller 110. Note that a four segment fetch/prefetch sequence is illustrated. However, as discussed earlier, if the miss occurs in the middle of a line, preceding segments are not prefetched. However, in another embodiment, preceding segments could be prefetched. Similarly, in another embodiment, there may be a different number of segments on each line of the cache.

An L1 miss 600 occurs and results in a request 602 to the L2 cache. If the L2 cache misses, then a fetch/prefetch request is made to L3 memory, as discussed with respect to FIG. 4. Latency 604 occurs while the L3 memory request is being processed. A first segment 605(1) is then returned to the L2 cache, followed in sequence by segments 605(2) and 605(3). However, a higher priority request 612 is received in response to an L1 miss 610 while the prefetch is in operation. Because it has a higher priority than request 602, the prefetch is halted and request 612 is processed. After latency 614, segment 615(1) is received from L3 memory, followed in sequence by segments 615(2–4).

Figure 6B:
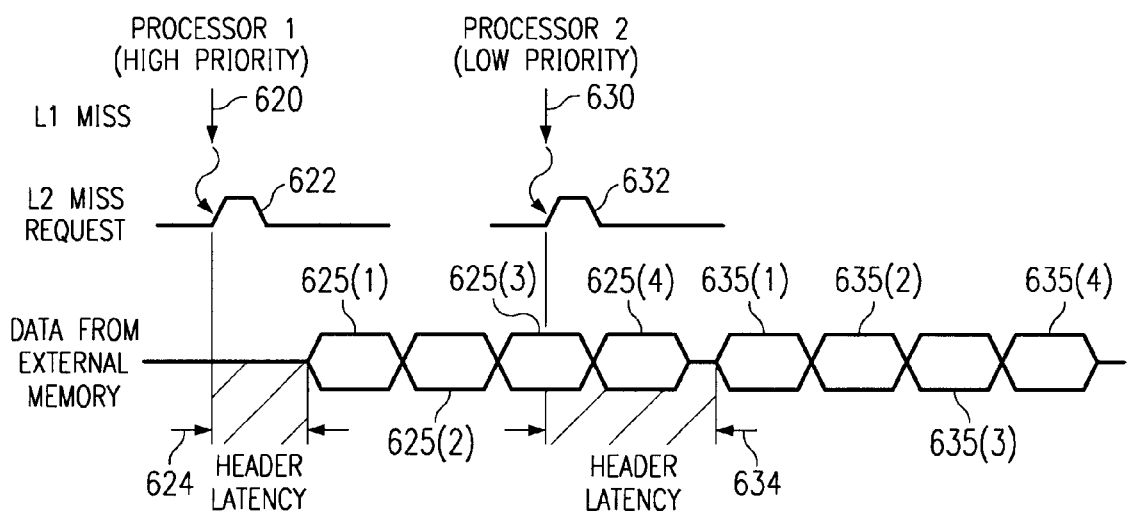
FIG. 6B is a timing diagram of the interruptible prefetch system illustrating a higher priority prefetch not being halted in favor of a lower priority miss.

FIG. 6B is a timing diagram of the interruptible prefetch system illustrating a higher priority prefetch not being halted in favor of a lower priority miss. In this case, an L1 miss 620 occurs and results in a request 622 to the L2 cache. If the L2 cache misses, then a fetch/prefetch request is made to L3 memory. Latency 624 occurs while the L3 memory request is being processed. A first segment 625(1) is then returned to the L2 cache, followed in sequence by segments 625(2–4). During the prefetch of segments 625(2–4), a lower priority request 632 is received in response to an L1 miss 630. However, because it has a lower priority than request 622, the prefetch is not halted and the prefetch of segments 625(2–4) is completed. Then request 612 is processed. After latency 634, segment 615(1) is received from L3 memory, followed in sequence by segments 615(2–4). Latency 634 is longer than latency 614.

Figure 7:
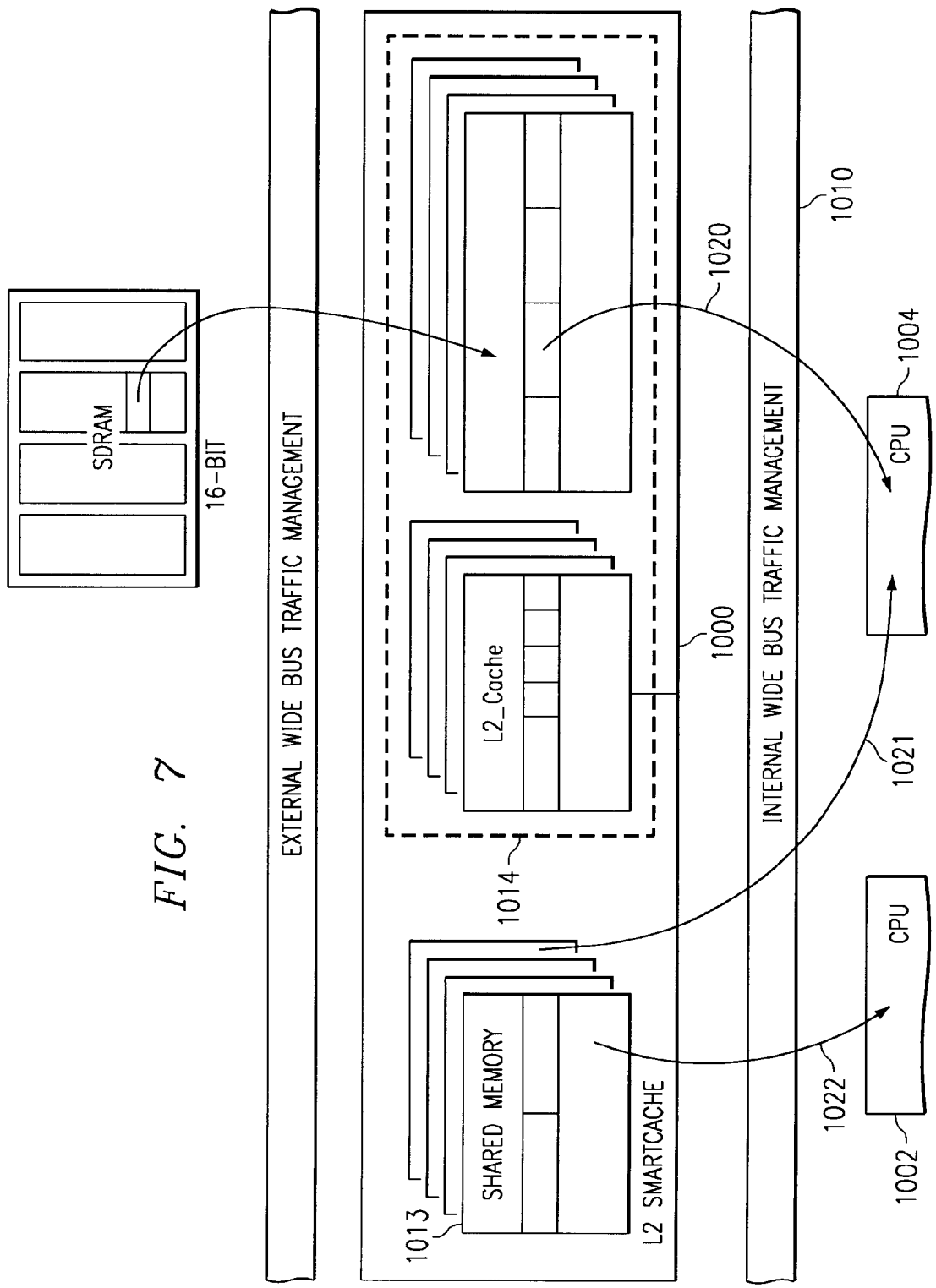
FIG. 7 is a flow diagram for the L2 configurable cache that illustrates concurrent access of the L2 cache and L2 RAM-set of the megacell of FIG. 1.

FIG. 7 is a flow diagram for an L2 configurable cache 1000 that illustrates concurrent access of L2 cache 1014 and L2 RAM-set 1013, which is representative of configurable cache 112 of megacell 100. The shared L2-Configurable cache's RAM-sets 1013 and Cache sets 1014 can be accessed concurrently. When different processors, such as processors 1002, 1004 for example, request an access to memory space stored in different memory blocks, the configurable cache 1000 services accesses in parallel.

For example, processor 1002 has request 1022 pending due to a miss in it's L1 instruction cache, processor 1004 has data request 1021 pending for a data request, and processor 1004 has request 1020 pending due to a miss in it's L1 instruction cache. Multiple buses connect processors 1002, 1004 and configurable cache 1000 and are controlled by traffic controller 1010.

Parallel decoding is done by RAM-sets 1013 to determine which pending accesses are within the address range of the RAM-set. Requests that fall within the RAM-set are excluded from cache 1014. Thus, accesses not located in RAM-sets 1013 are reordered and queued for cache 1014. RAM-set 1013 and cache 1014 then make concurrent accesses for the pending requests. If a concurrent access is not possible because the two memory spaces corresponding to the requests are in the same memory block, then the request are served sequentially.

Figure 8A:
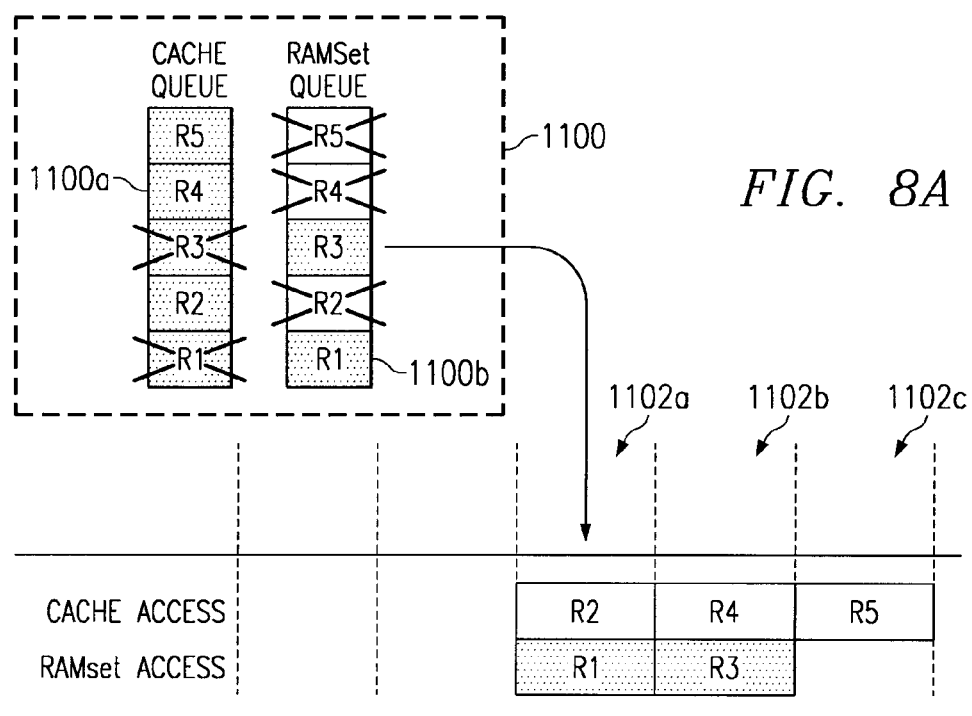
FIG. 8A illustrates a request queue for the L2 memory system of FIG. 3A

FIG. 8A illustrates a request queue for the L2 memory system of FIG. 7. The system contains a request queue 1100 that stores the waiting access request from different processors. Conceptually, two queues 1100a, 1100b are formed with a duplicate list of pending requests. Parallel decoding is then done by RAM-sets 1013 (see FIG. 7) to determine which pending accesses are within the address range of the RAM-set. Requests that fall within the RAM-set are excluded from cache 1014. In this example, requests R1 and R3 fall within the RAM-set, therefore they remain in RAM-set queue 1100b and are excluded from cache queue 1100a. Requests R2, R4, and R5 are not located in RAM-sets 1013 and are therefore are excluded from RAM-set queue 1100b. The non-excluded requests in each queue are reordered and queued for access. RAM-set 1013 and cache 1014 then make concurrent accesses for the pending requests as illustrated in time slots 1102a–c. If a concurrent access is not possible because the two memory spaces corresponding to the requests are in the same memory block, then the request are served sequentially.

Figure 8B:
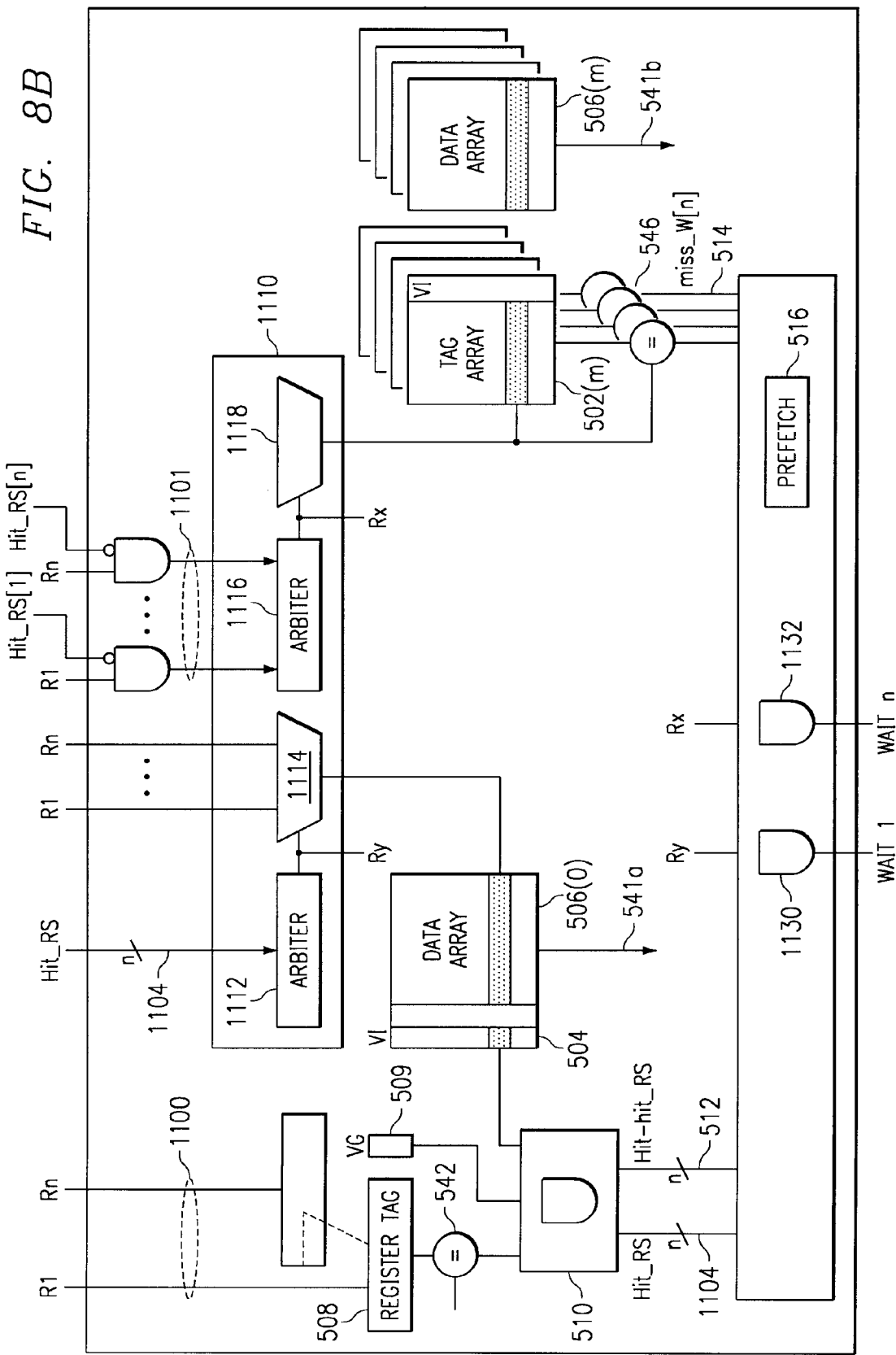
FIG. 8B is a more detailed block diagram of the L2 memory system of FIG. 3A, illustrating the request queue.

FIG. 8B is a more detailed block diagram of the L2 memory system of FIG. 3A, illustrating the request queue circuitry. A set of pending requests R1–Rn 1100 is compared in parallel to base register 508 using a set of comparators 542. Hit circuitry 510 asserts corresponding hit_RS signals 1104 if global valid bit 509 is asserted for each pending request that matches tag register 508. Arbitration circuitry 1112 within management circuitry 1110 receives hit_RS signals 1104 and selects one Ry from among those that are asserted. Multiplexor 1114 is responsive to arbitration circuitry 1112 and selects corresponding request address Ry from pending requests R1–Rn and applies this selected request address to RAM-set data array 506. Thus, the set of asserted Hit_RS signals 1104 correspond to RAM-set queue 1100b as illustrated in FIG. 8A. If the associated individual valid bit VI 504 is set, hit-hit signal 512 is asserted and a requested data/instruction value is returned to the requester. If the associated individual valid bit is not set, then a hit-miss condition occurs, as discussed earlier, and a wait indication WAIT 1 is asserted by wait circuitry 1130 while a RAM-set fill is performed. When valid data is in data array 506(0), it is provided to a requesting device via data bus 541a that is connected via a cache output port to traffic block 110.

Concurrently, arbitration circuitry 1116 within management circuitry 1110 receives cache request signals 1101 and selects one Rx from among those that are asserted. Multiplexor 1118 is responsive to arbitration circuitry 1116 and selects corresponding request address Rx from pending requests 1100a and applies this selected request address to cache tag array 502(n). Each cache request signal 1101 is asserted only if a request R1–Rn is asserted and a corresponding hit_RS signal 1104 is not asserted, in response to mask circuitry 1106a–n. Thus, the set of asserted cache request signals 1101 correspond to cache queue 1100a as illustrated in FIG. 8A. If one of miss-way signals 514 is not asserted, then a hit has occurred and the requested data/ instruction is returned to the requester. If all four miss-way signals are asserted, then a miss condition occurs, as discussed earlier, and a wait indication is asserted by wait circuitry 1132 while a cache fill is performed under control of prefetch circuitry 516. When valid data is in data array 506(n), it is provided to a requesting device via data bus 541b that is connected via another cache output port to traffic block 110.

Advantageously, data bus 541a and data bus 541b can provide requested data to two different requesters concurrently via two separate cache output ports and parallel busing within traffic block 110.

An aspect of the present embodiment is that during the loading of the L2 cache, which takes potentially several tens of cycles, the arbitrator 1116 may let other CPUs access the L2 cache. If they hit, they can continue without being impacted by the miss caused by a prior CPU request. If they miss but have a lower priority they wait until completion of the current prefetch transfer. If a request misses and has a higher priority, that request interrupts the current transfer on a segment boundary and is served next, depending on the state of the memory controller.

For example, single port dynamic access RAM (SDRAM) memory 134 has a controller that provides information such as active row, as described in U.S. Pat. No. 6,253,297, Memory Control Using Memory State Information for Reducing Access Latency. If the higher priority request is for an SDRAM active row, then it might be worth interrupting the previous burst. Otherwise, it might be preferable to complete the current transfer to avoid unnecessary precharge operation on the SDRAM. Memory state signals 1120 received from memory controller 934 provide state information to management circuitry 1110 that is used to determine if an active prefetch operation should be preempted and halted by a pending request.

Figure 8C:
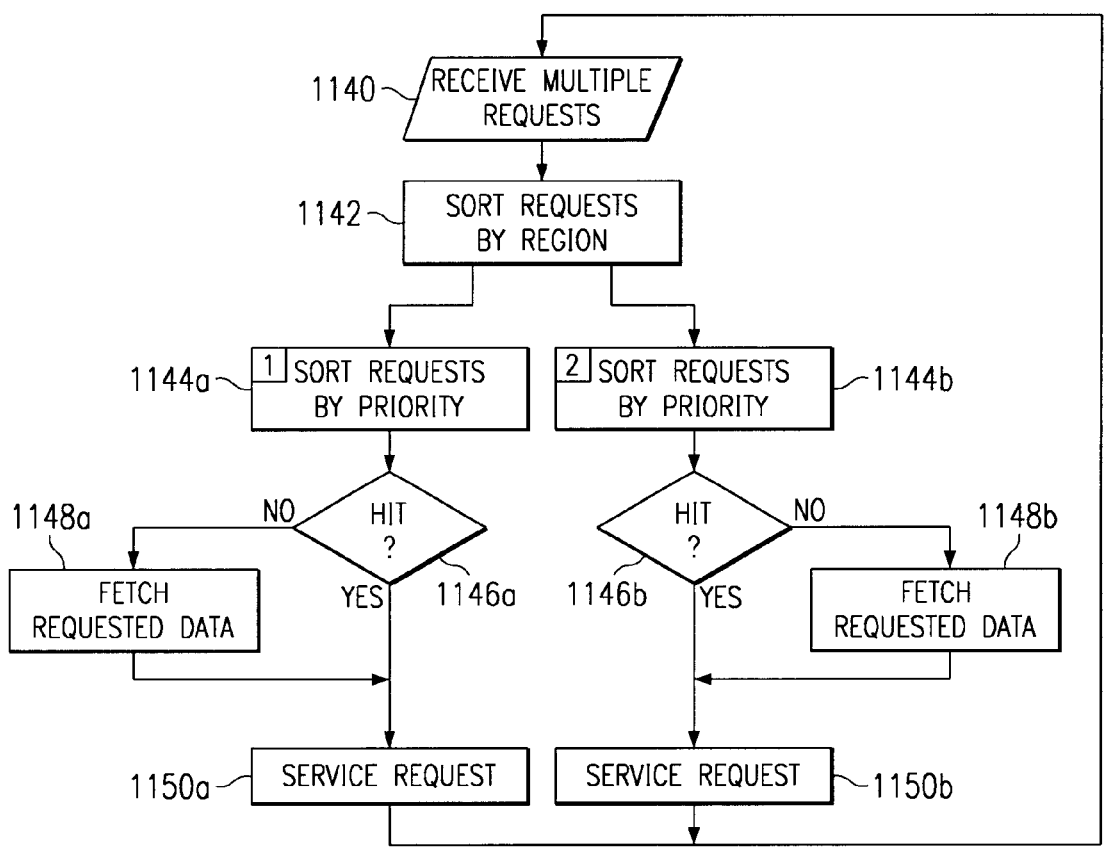
FIG. 8C is a flow chart illustrating operation of simultaneous multiprocessor accesses to the L2 cache of FIG. 3A.

FIG. 8C is a flow chart illustrating operation of simultaneous multiprocessor accesses to the L2 cache of FIG. 3A using the queues and arbitration circuitry discussed with reference to FIG. 8A and FIG. 8B.

In step 1140, multiple requests for access to the cache are received from the plurality of request ports. As discussed earlier, the cache has a number of request ports that receive requests from the DSP 104, MPU 102, system host 120 and the other application specific processors 108, if present. Furthermore, DSP 104 can post a request for a miss in L1 data cache 202 simultaneously with posting a request for a miss in L1 instruction cache 206. Likewise, MPU 102 can post a request for a miss in L1 data cache 222 simultaneously with posting a request for a miss in L1 instruction cache 226.

In step 1142, all of the requests received on a given cycle are sorted according to which portion of the cache will service them. As discussed with reference to FIG. 8B, detection circuitry including comparators 542 and hit circuitry 510 determine which of the requests fall within the portion 506(0) of the cache subsystem. The requests that correspond to the portion 506(0) are then blocked from cache portion 506(n) by masking circuitry 1106.

Steps 1144a and 1144b are performed on the sorted results of step 1142. Step 1144a represents cache requests that are sorted for one portion of the cache, while step 1144b represents cache requests that are sorted for a different portion of the cache. In each of these steps, the requests are sorted according to priority information that is provided along with each request to form a queue of requests. Such priority information will be described with reference to FIG. 9.

In steps 1146a and 1146b, the highest priority request is taken from each queue formed by steps 1144a,b and a cache hit determination is made using the detection circuitry of each portion of the cache. Advantageously, steps 1146a and 1146b are performed concurrently using the separate detection circuitry in each portion of the cache.

In steps 1148a,b, a fetch is made to acquire data if the corresponding hit decision from steps 1146a,b indicates a miss. If a miss occurs in either of steps 1146a,b, then additional time is required to perform the fetch to L3 memory. In the present embodiment, the same prefetch circuitry 516 is used to control the prefetch; therefore if both of steps 1148a, b are performed, they are performed in sequence.

In steps 1150a,b, the requested data is provided to each requester, after being prefetched if needed. However, if both steps 1146a and 1146b determine a hit status for both requests, then no fetch is needed and steps 1150a and 1150b are performed concurrently using parallel data buses in traffic control block 110.

In the present embodiment, the cache is configurable to have two different portions, such that two different queues are formed in step 1142. In another embodiment, a cache may be partitioned into more than two portions and therefore more than two queues would be formed. Likewise, in another embodiment, more than two parallel data buses in traffic block 110 may service more than two requests from the same cache concurrently. In another embodiment, additional prefetch circuitry can be provided to allow concurrent prefetch operations.

Figure 9:
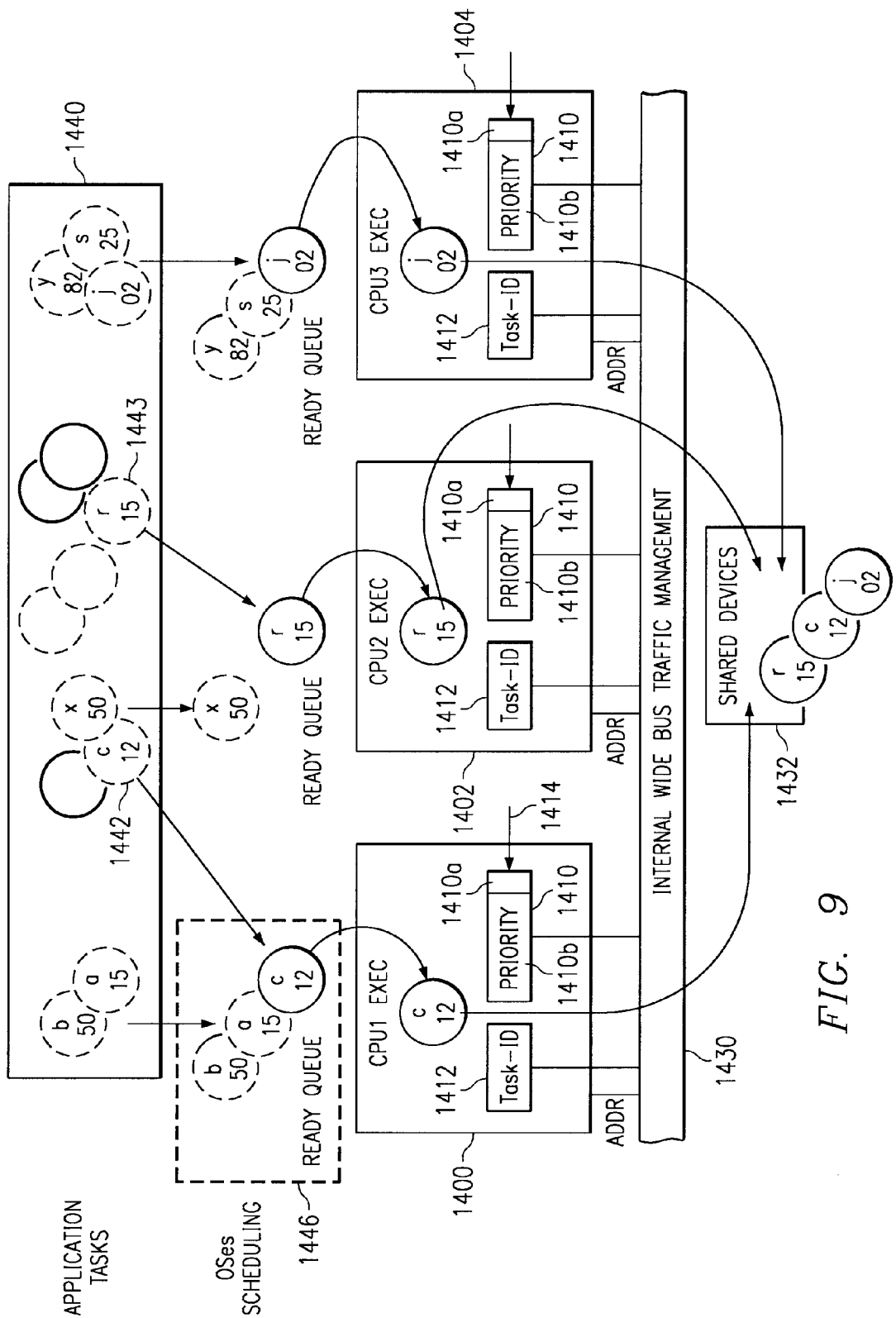
FIG. 9 is a block diagram illustrating a priority register in each processor of a megacell similar to that of FIG. 1 for task based priority arbitration.

FIG. 9 is a block diagram illustrating a priority register in each processor of a megacell similar to that of FIG. 1 for task based priority arbitration. Typically, each software task includes a task priority value that is commonly used by an operating system to schedule an order of execution for a set of pending tasks 1440. In this illustration, a circle such as 1442 represents a task, with a task name "c" and a task priority of 12, for example. Likewise, task 1443 has a task name "r" and a priority of 15, where a lower number indicates a higher priority. If the set of tasks 1440 are assigned to three processors, then an operating system on each processor forms a ready to execute queue, such as ready queue 1446 in which task "c" is scheduled for first execution, then task "a" and finally task "b" according to priority values of 12, 15, and 50 respectively. In a prior system, access to shared resources 1432 would be based on an access priority associated with the processor on which a task is executed. Unfortunately, this scheme may result in slow execution of a high priority task on a low priority processor.

Three processors 1400, 1402, 1404 are illustrated; however, the concept is applicable to only two processors or to four our more. A priority register 1410 is associated with a task_ID register 1412 in processor 1400. Each of the other processors is similarly equipped. A priority field value from priority register 1410 is exported to traffic control logic 1430 that prioritizes access to shared resources 1432, that can be L2 cache, for example, or other memory or interface devices, for example.

One bit 1410*a* of register 1410 is responsive to interrupt signal 1414 such that whenever 1400 performs a context switch in response to an interrupt, bit 1410*a* is set to a value to indicate an interrupt service routine (ISR) is being executed.

In a first embodiment with a simple solution, portion 1410*b* of register 1410 is only one bit, such that register 1410 is a 1+1 bit register (2-bits). As discussed above, bit 1410*a* is set by the hardware when an interrupt (or an exception) occurs. An application program being executed by processor 1400 can configure portion 1410*b* and will provide one value to the bit if the application must execute with a defined maximum real time, referred to as "hard real time" (HRT). On the other hand, an application that does not have a hard time limit will provide another value to the bit to indicate "soft real time" (SRT). An operating system on processor 1400 can control both bits. Thus, 2-bit priority code is formed as described in Table 3. In the case of an interrupt, the contents of priority register 1410 are saved prior to taking an ISR context switch.

TABLE 3

1 + 1 Bit Priority

| Type of task | priority | Set by | code |
|---|---|---|---|
| Interrupt service routine | highest | Interrupt hardware | 00 |
| Kernal OS task | | Kernal software | 01 |
| Hard real time task | | Application software | 10 |
| Soft real time task | lowest | default | 11 |

In an alternative embodiment, priority register portion 1410*b* is n bits, where n is generally 8-bits. One bit 1410*a* of register 1410 is responsive to interrupt signal 1414 such that whenever 1400 performs a context switch in response to an interrupt, bit 1410*a* is set to a value to indicate an interrupt service routine (ISR) is being executed. Bit 1410*a* is treated as a most significant bit of priority register 1410, thus 1+n bits are provided for the OS priority field by priority register 1410. In this embodiment, a task priority associated with each task is loaded in priority register portion 1410*b* as each task begins execution.

In either embodiment, the 2 bits or n+1 bits are used to control the priority of accesses to shared resources 1432. In addition, each resource is also assigned a priority. If two resource make a requests with identical task priority to a shared resource, then access to the shared resource is provided in a round robin manner so that the higher priority resource doesn't starve the lower priority resource.

In an alternative embodiment, two fields are used to determine the access priority to the shared resources. One field comes from the processor and carries the priority associated with the current task and the second field comes from an MMU TLB that contains the priority of a given MMU page. The highest value is used for priority arbitration.

Digital System Embodiment

Figure 10:
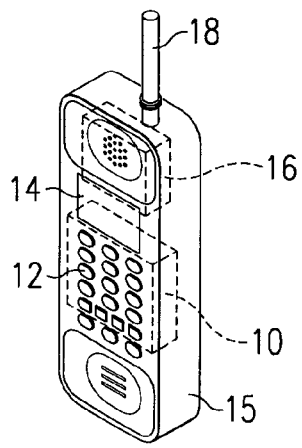
FIG. 10 is a representation of a telecommunications device incorporating an embodiment of the present invention.

FIG. 10A illustrates an exemplary implementation of an example of such an integrated circuit in a mobile telecommunications device, such as a mobile telephone with integrated keyboard 12 and display 14. As shown in FIG. 10, the digital system 10 with a megacell according to FIG. 2 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

It is contemplated, of course, that many other types of communications systems and computer systems may also benefit from the present invention, particularly those relying on battery power. Examples of such other computer systems include personal digital assistants (PDAs) portable computers, smart phones, web phones, and the like. As power dissipation is also of concern in desktop and line-powered computer systems and micro-controller application, particularly from a reliability standpoint, it is also contemplated that the present invention may also provide benefits to such line-powered systems.

Fabrication of the digital systems disclosed herein involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

The digital systems disclosed herein contain hardware extensions for advanced debugging features. These assist in the development of an application system. Since these capabilities are part of the megacell itself, they are available utilizing only a JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, in another embodiment, the L2 cache may be a simple cache that does not include RAM-set or configurable features while still providing two or more concurrent access ports using concurrent detection circuitry. The cache may be positioned at a level other than L2. The cache may have a different set organization with a different number of segments per line, for example. The cache may have more than two detection circuits and output ports so that three or more requests can be serviced concurrently.

It is therefore contemplated that the appended claims will cover any such modifications of the embodiments as fall within the true scope and spirit of the invention.

What is claimed is:

1. A method of operating a digital system having a cache connected to a plurality of request ports, the method comprising the steps of:

dividing the cache into a first portion of the cache and a second portion of the cache;

assigning a first range of addresses to a first portion of the cache;

blocking any address from the first range of addresses from being cached in a second portion of the cache;

receiving a plurality of requests for access to the cache from the plurality of request ports;

concurrently evaluating at least two requests from the plurality of requests to determine hit/miss status; and concurrently serving two requests from the plurality of requests that hit in the cache when a first request hits the first portion of the cache and a second request hits the second portion of the cache.

2. The method of claim 1, wherein:

said step of dividing the cache into a first portion of the cache and a second portion of the cache includes providing a first set of tags for the first portion of the cache and a second set of tags for the second portion of the cache; and said step of concurrently evaluating at least two requests from the plurality of requests to determine hit/miss status includes comparing a first request address with the first set of tags concurrently with comparing a second request address with the second set of tags.

3. The method of claim 2, wherein:

said step of providing a first set of tags has a first number of valid bits per line; and said step of providing a second set of tags has a second number of valid bits per line different from the first number of valid bits per line.

4. The method of claim 2, wherein:

said step of providing a first set of tags a single tag per set; and said step of providing a second set of tags has a plurality of tags per set.

5. The method of claim 2, wherein:

said step of dividing the cache into a first portion of the cache and a second portion of the cache includes providing the first portion of the cache with a first number of lines and the providing the second portion of the cache with a second number of lines different from the first number of lines.

6. A digital system having a cache, wherein the cache comprises:

a plurality of sets which each have a plurality of lines for holding data and an associated tag to indicate if data stored in each line is valid;

first detection circuitry operable to detect if a first requested data is present in a first portion of the cache assigned a first range of addresses by examining a first set of tags; and second detection circuitry operable to detect if a second requested data is present in a second portion of the cache blocked from caching any address from the first range of addresses by examining a second set of tags, wherein the first detection circuitry and the second detection circuitry operate concurrently.

7. The digital system according to claim 6, further comprising blocking circuitry connected between the first detection circuitry and the second detection circuitry, the blocking circuitry operable to block a first request from being presented to the second detection circuitry if the first request is within the first range of addresses.

8. The digital system according to claim 7, wherein the first set of tags has a first number of valid bits per line and the second set of tags has a different second number of valid bits per line different from the first number of valid bits per line.

9. The digital system according to claim 8, wherein the first portion of the cache has a single tag per set and the second portion of the cache has a plurality of tags per set.

10. The digital system according to claim 9, wherein the first portion of the cache has a first number of lines and the second portion of the cache has a different second number of lines different from the first number of lines.

* * * * *